H. J. HJORTH.
END THRUST ADJUSTMENT FOR MACHINE SPINDLES.
APPLICATION FILED AUG. 1, 1907.
989,261.
Patented Apr. 11, 1911.
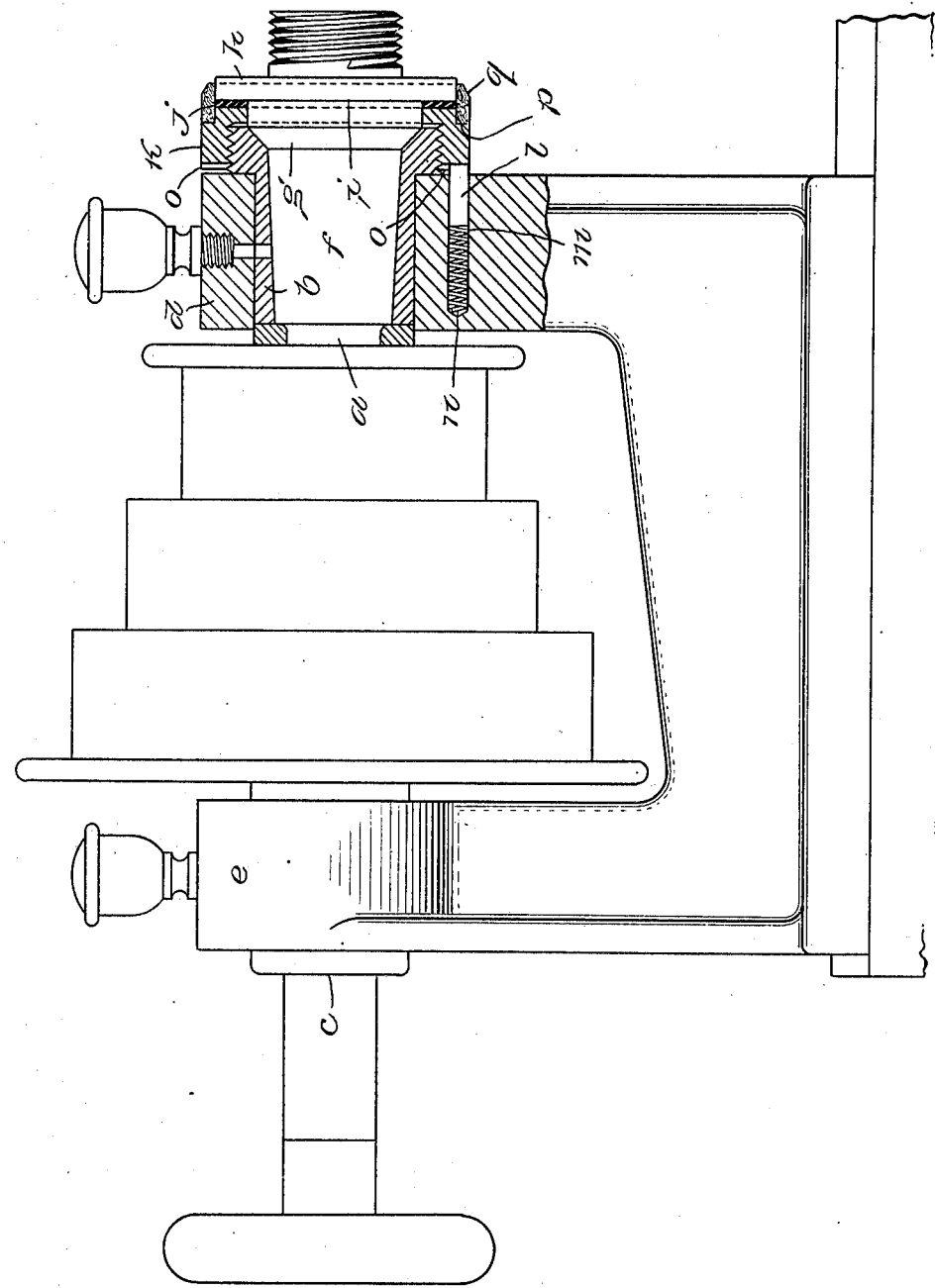

UNITED STATES PATENT OFFICE.

HENRY J. HJORTH, OF CAMBRIDGE, MASSACHUSETTS.

END-THRUST ADJUSTMENT FOR MACHINE-SPINDLES.

989,261.
Specification of Letters Patent.
Patented Apr. 11, 1911.

Application filed August 1, 1907. Serial No. 386,534.

*To all whom it may concern:*

Be it known that I, HENRY J. HJORTH, of Cambridge, in the county of Middlesex and State of Massachusetts, have invented certain new and useful Improvements in End-Thrust Adjustments for Machine-Spindles, of which the following is a specification.

The present invention relates to an improvement in spindles for machine tools, particularly for the driving spindles of lathes and grinding machines, and has for its object to prevent the wedging of the spindle in its bearing due to the pressure produced through elongation of the work when heated.

When metal pieces are being operated upon by machine tools, they become considerably heated, and consequently expand. When such pieces under these conditions are held by rotating spindles, the elongation produces an endwise pressure on the spindles, tending to force the latter farther into and wedge them in their bearings. This results in increasing the friction in the bearing and causing the same to hug and to be turned and roughened on the bearing surface. Frequently the excessive friction causes the machine to stop.

In the present invention by providing a square end-thrust bearing, I render impossible such endwise movement of the spindle, and so eliminate entirely all danger of the hugging of the spindle in its bearing, and the consequent liability to become roughened and gouged, or to stick.

The drawing illustrates the head-stock of a machine tool, such as a lathe, having a spindle provided with the improvements which constitute my invention.

In the drawing, $a$ represents the spindle of a machine tool which is contained in bushings $b$ and $c$ held in brackets $d$ and $e$ which in the present embodiment of the invention constitute the head-stock of a lathe or grinder. At the right-hand end the spindle is threaded to receive a chuck, and cored out to hold the usual live center. That portion $f$ of the spindle which is contained in the bushing $b$ is tapered at a slight angle with the axis, while the interior of the bushing is correspondingly tapered, and at the right of this portion is a conical shoulder $g$ of more abrupt inclination, bearing against a correspondingly-shaped concave surface in the bushing. When the spindle is forced to the left by elongation of the work due to heating, pressure of the tool or other reason, there is a tendency for the tapered portion $f$ to become wedged into the bushing and to stick, either stopping the spindle or roughening and destroying its smooth surface. To prevent such result, I provide on the spindle a flange $h$ having a perpendicular surface $i$ which bears against a washer $j$. This washer may be of fiber, rawhide, or other hard substance, or a ball bearing may be substituted, and it is supported by an adjusting ring $k$ threaded on the end of bushing $b$. It will be seen that the flange $h$ and adjusting ring take the end thrust of the spindle and relieve the tapered bearing of any part thereof. By turning the ring by the necessary amount, the tapered bearing may be relieved of any pressure except a lateral one.

I am aware that constructions have heretofore been designated for the purpose of preventing sticking of machine spindles in their tapered bearings. Such constructions have included end-thrust bearings engaged with the spindles on the side of the tapered bearing opposite to that from which the operative end of the spindle projects, that is, the tapered bearings have been located between the end of the spindle against which the pressure tending to produce endwise movement is applied and the end-thrust bearing. When so located, the end-thrust bearing is ineffective for the purpose, and when so adjusted as to eliminate looseness between the spindle and its tapered bearing, will not prevent the spindle from sticking. This is probably due to the fact that the comparatively great distance of the end-thrust bearing from the tapered surface in which sticking is liable to occur, permits a sufficient compression of the spindle to allow its tapered shoulder to crowd into the tapered bearing. In my device, however, the location of the end-thrust bearing between the tapered bearing and the end of the spindle upon which the end-thrust in operation is applied, absolutely prevents any such motion of the spindle in the direction of its length as would cause its tapered portion to bind in the tapered bearing.

The ring is retained in any position of adjustment by a pin $l$ having slots across its end which is set into a socket $m$ in the bracket $d$ and pressed outward by a spring $n$. The end of the pin enters notches $o$ in the adjacent face of the adjusting ring, thereby holding the latter in place. A recess $p$ is turned into the ring at its outer end to receive a dust guard *q* which extends over the washer *j* and flange *h* to prevent dust and chips working in between the washer and bearing surface *i*.

It will be noted that the threaded end of the bushing *b* projects beyond the side of bracket *d* and that the adjusting ring is wholly outside of said bracket, while the locking pin *l* also protrudes from the face of the bracket. It is to be understood, however, that such a construction is not essential, but that it is equally within the purview of my invention to form a recess in the side of the bracket and place the whole of the bushing, the adjusting ring and the pin within such recess. It is also within the scope of my invention to provide the adjusting ring with external threads to engage internal threads formed in the walls of such a recess, the periphery of the bushing being then entirely smooth, instead of screwing the adjusting ring upon external threads on the bushing, as previously described.

I claim:—

1. In a machine tool, a spindle, a bracket, a bearing bushing surrounding said spindle and contained immovably in said bracket, said bushing and spindle having complemental surfaces gradually increasing in diameter toward their outer end and abruptly tapered at such end, said spindle having a flange between its end and the adjacent end of the bushing, and an adjustable end-thrust bearing between said flange and the outer end of said bushing for relieving the tapered surfaces of end thrust and equalizing the wear on different parts of said surfaces.

2. In a machine tool a bracket, a spindle mounted rotatably in said bracket, a bearing bushing contained in said bracket and surrounding said spindle, one end thereof extending beyond the bracket toward the end of the spindle, said spindle having a shoulder between its end and the bushing, and a thrust member mounted on the projecting end of the bushing and adjustable longitudinally thereon, out of contact with the bracket, for engaging said shoulder and opposing the end thrust of the spindle independently of any alteration in the relation of the bushing to the bracket.

3. In a machine tool, a two-armed bracket, a spindle passing through both arms of said bracket, a bearing bushing contained in one of said arms and surrounding said spindle, said bushing and spindle being convergently tapered in a direction from the end toward the middle part of the spindle, the spindle having a shoulder between its end and the larger end of the tapered portion, and a thrust member mounted and longitudinally adjustable on said bushing between the end thereof and said shoulder and independent of the bracket, for engaging the shoulder and opposing the end thrust of the spindle.

4. In a machine tool, a spindle having provisions on one end thereof for supporting work, bearings for said spindle, a tapered bushing in the one of said bearings next to the work-holding end of the spindle, the spindle having a shoulder between its end and the last-named bearing, an adjusting ring threaded on said bushing and having a flange interposed between said shoulder and the adjacent end of the bushing for taking the end thrust of the spindle, and a spring-pressed pin mounted near said ring and arranged to engage notches formed thereon for maintaining the adjustments of the ring.

In testimony whereof I have affixed my signature, in presence of two witnesses.

HENRY J. HJORTH.

Witnesses:
 CHAS. F. REMINGTON,
 E. M. BERTSCH.

---

Copies of this patent may be obtained for five cents each, by addressing the "Commissioner of Patents, Washington, D. C."